Dec. 10, 1963     M. B. SHULMAN     3,113,464
RADIO ACTIVE TRANSDUCER
Filed July 28, 1961
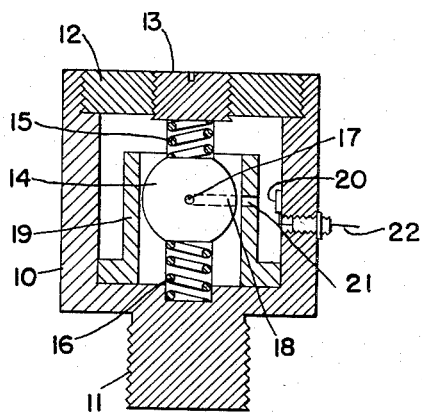
INVENTOR.
MEYER B. SHULMAN
BY
ATTORNEYS:

United States Patent Office 3,113,464
Patented Dec. 10, 1963

3,113,464
RADIO ACTIVE TRANSDUCER
Meyer B. Shulman, Philadelphia 31, Pa., assignor to the United States of America as represented by the Secretary of the Army
Filed July 28, 1961, Ser. No. 128,904
1 Claim. (Cl. 73—517)
(Granted under Title 35, U.S. Code (1952), sec. 266)

The invention described herein may be manufactured and used by or for the Government for governmental purposes without the payment to me of any royalty thereon.

This invention is an improvement over that disclosed by Saul Wanetick in U.S. Patent No. 3,024,364 for "Radio Active Transducer," issued March 6, 1962.

The transducer of this aforesaid copending application includes a radioactive source from which a collimated beam of radio active particles is transmitted to a scintillation detector. In the operation of this transducer, the number of radioactive particles reaching the scintillation detector is determined by a shield which is located between the source and the detector. This shield is resiliently supported and is fixed to a mass by which it is positioned in accordance with the acceleration of the transducer. This transducer leaves something to be desired with respect to the ease of its adjustment, the accuracy of its operation and the compactness of its structure.

These difficulties are obviated by the present invention. One of its outstanding features is the combining of the mass and the radioactive source in a single unitary structure so that they are both positioned in accordance with the acceleration of the transducer. This results in several advantages not heretofore realized. It permits the use of a stationary shield thus eliminating errors encountered in the use of the resiliently mounted shield. It permits ready adjustment of the radioactive source with respect to the opening in the stationary shield. It puts the scintillation detector in a readily accessible location. It results in a compact transducer which is readily mounted on a specimen under test.

The invention will be better unnderstood from the following description when considered in connection with the accompanying drawing and its scope is indicated by the appended claim.

The single FIGURE of the drawing illustrates a radioactive transducer or accelerometer which includes an enclosure 10. This enclosure has at one end a stud 11 for mounting it on a device to be tested. At the other end of the casing 10 is a cap 12 which is threaded into the enclosure and has threaded into it a guide plug 13.

A hollow lead sphere 14 is supported between the plug 13 and the stud 11 by means of springs 15 and 16 and encloses a source 17 of radioactive particles. The sphere 14 has a slit 18 and is surrounded by a drum 19 of aluminum or other radioactive particle absorbing material. Mounted inside the enclosure 10 is a scintillation detector 20 which is exposed to the source 17 through the slit 18 and an opening 21 in the stationary shield or drum 19. By means of the plug 13, the relation between the slit 18 and the opening 21 may be adjusted as desired.

To obtain a sizeable change in the number of radioactive particles received at the scintillation counter 20, two conditions must be met. First, a collimated beam must be formed. This is accomplished by the slit 18. Secondly, the beam must be interrupted to an extent dependent on the acceleration of the transducer. This is accomplished by so mounting the sphere 14 and the source 17 that they are positioned in accordance with the acceleration of the transducer. Under these conditions, the number of radioactive particles reaching the detector 20 is determined by the acceleration of the transducer and the detector output may be delivered through lead 22 to a device to be operated upon the attainment of a predetermined acceleration.

I claim:

An accelerometer including an enclosure having at one end a support for fixing it to a device to be tested and at the other end a cap into which a plug is threaded, a scintillation detector mounted on the interior of said enclosure, a shield supported in said enclosure and having an opening alined with said detector, said shield being impervious to radioactive particles, a member enclosing a source of radioactive particles and having a slit opening outwardly from said source toward said shield, and means resiliently supporting said member between said support and said plug, said plug being adjustable to aline said slit with said opening, whereby said slit opens into the opening of said shield to an extent determined by the acceleration to which said accelerometer is subjected.

References Cited in the file of this patent
UNITED STATES PATENTS

| | | |
|---|---|---|
| 2,301,396 | Graf | Nov. 10, 1942 |
| 2,660,062 | Frowe | Nov. 24, 1953 |
| 2,872,586 | Papanek | Feb. 3, 1959 |